United States Patent
Mendes

(10) Patent No.: US 12,376,000 B2
(45) Date of Patent: Jul. 29, 2025

(54) MULTIPATH GEOGRAPHIC ROUTING PROTOCOL

(71) Applicant: Airbus (S.A.S.), Blagnac (FR)

(72) Inventor: Paulo Mendes, Munich (DE)

(73) Assignee: Airbus (S.A.S.), Blagnac (FR)

( * ) Notice: Subject to any disclaimer, the term of this patent is extended or adjusted under 35 U.S.C. 154(b) by 481 days.

(21) Appl. No.: 17/846,712

(22) Filed: Jun. 22, 2022

(65) Prior Publication Data

US 2022/0417829 A1    Dec. 29, 2022

(30) Foreign Application Priority Data

Jun. 23, 2021    (EP) .................................... 21181232

(51) Int. Cl.

| H04W 40/24 | (2009.01) |
|---|---|
| H04W 40/06 | (2009.01) |
| H04W 40/20 | (2009.01) |
| H04W 48/16 | (2009.01) |
| H04W 48/20 | (2009.01) |
| H04W 84/18 | (2009.01) |
| H04W 88/08 | (2009.01) |

(52) U.S. Cl.
CPC ......... *H04W 40/246* (2013.01); *H04W 40/06* (2013.01); *H04W 40/20* (2013.01); *H04W 48/16* (2013.01); *H04W 48/20* (2013.01); *H04W 84/18* (2013.01); *H04W 88/08* (2013.01)

(58) Field of Classification Search
CPC ... H04W 40/246; H04W 40/20; H04W 40/06; H04W 48/20; H04W 48/16; H04W 88/08
See application file for complete search history.

(56) References Cited

U.S. PATENT DOCUMENTS

| 8,238,317 | B2 | 8/2012 | Yang et al. |
| 9,832,705 | B1 | 11/2017 | Newton et al. |
| 10,411,978 | B1 * | 9/2019 | Ball ........................ H04L 43/12 |
| 12,034,821 | B2 * | 7/2024 | Wang .................... H04L 67/146 |
| 2004/0004967 | A1 * | 1/2004 | Nakatsugawa ..... H04L 61/5084 370/328 |

(Continued)

FOREIGN PATENT DOCUMENTS

WO    WO 2017/063866 A1    4/2017

OTHER PUBLICATIONS

Yan Zhang et al, "Wireless Mesh Networking," Jan. 1, 2007, Auerbach Publications, p. 120.

(Continued)

*Primary Examiner* — Parth Patel
(74) *Attorney, Agent, or Firm* — KDW Firm PLLC

(57) ABSTRACT

Systems and methods for routing data packets in mobile ad-hoc networks. An interest packet is sent from a data consumer to a data producer via multiple intermediate routing devices. The interest packet is transmitted from one routing device to the next routing device based on the geographic position of the routing devices and the interest message carries information about the links and network nodes it passes when being transmitted. The data packet is transmitted from the data producer to the data consumer the same path in the reverse order. In case one of the intermediate nodes is not available anymore, due to the mobile nature of the ad-hoc network, an opportunistic forwarding strategy is applied.

11 Claims, 3 Drawing Sheets

(56) References Cited

U.S. PATENT DOCUMENTS

| | | | | |
|---|---|---|---|---|
| 2004/0264372 | A1* | 12/2004 | Huang | H04W 40/02 370/310 |
| 2005/0122955 | A1* | 6/2005 | Lin | H04L 45/26 370/351 |
| 2007/0195702 | A1* | 8/2007 | Yuen | H04L 45/122 370/238 |
| 2014/0025775 | A1 | 4/2014 | Lee et al. | |
| 2019/0141495 | A1* | 5/2019 | Jha | H04W 40/026 |
| 2022/0182334 | A1* | 6/2022 | Kang | G06F 9/547 |
| 2022/0417829 | A1* | 12/2022 | Mendes | H04L 45/34 |
| 2024/0340773 | A1* | 10/2024 | Milheiro Mendes | H04L 41/0806 |

OTHER PUBLICATIONS

Wang ZW et al, "Vector address routing protocol for MANET," Signal Processing, 2008. ICSP 2008. 9th International Conference on IEEE, Piscataway, NJ, Oct. 26, 2008. pp. 2640-2644.

Ahlgren B. et al, "A survey of information-centric networking," IEEE Communications Magazine, IEEE Service Center, Piscataway, US, vol. 50, No. 7, Jul. 1, 2012.

Dannewitz, Christian et al, "Network of Information (NetInf)—An information-centric networking architecture," Computer Communications, Elsevier Science Publishers BV, Amsterdam, NL, vol. 36, No. 7, Jan. 27, 2013.

Wang Xiaonan et al, "Vehicular Content-Centric Networking Framework," IEEE Systems Journal, IEEE, US. vol. 13, No. 1. Mar. 1, 2019, pp. 519-529.

Arafat Muhammad Yeasir et al, "Routing Protocols for Unmanned Aerial Vehicle Networks: A Survey," IEEE Access, vol. 7, Jul. 25, 2019, pp. 99694-99720.

Anonymous, "How Switches Forward Frames Explained," www.computernetworkingnotes.com, Feb. 25, 2021, pp. 1-4.

European Search Report for U.S. Appl. No. 21/181,275 dated Nov. 3, 2021.

European Search Report for U.S. Appl. No. 21/181,278 dated Dec. 2, 2021.

European Search Report for U.S. Appl. No. 21/181,232 dated Dec. 3, 2021.

* cited by examiner

MULTIPATH GEOGRAPHIC ROUTING PROTOCOL

CROSS-REFERENCE TO RELATED APPLICATION

This application claims priority to EP 21181232.6 filed Jun. 23, 2021, the entire disclosure of which is incorporated by reference herein.

TECHNICAL FIELD

The description relates to systems and methods for routing data packets between a first end device and a second end device. In particular, the description relates to routing of data packets in data networks with dynamically changing network topology and intermittent connectivity between multiple routing devices that are part of the data network.

BACKGROUND

Data networks are generally used to transmit data between data producers and data consumers. Data networks typically have a topology that is known a priori. Based on the known topology of the data network, data packets are routed from one end device via one or more routers to another end device. For redundancy reasons, multiple different routes may be provided, and the routers choose one or more of these routes for transmitting data.

For example, in large scale flying ad-hoc networks, routing is a challenging task. Existing Mobile Ad-hoc Networks (MANETs) routing protocols need to have a stable route connection between the source and destination, which is a situation that may not occur in flying ad-hoc networks, since such networks have a dynamic topology resulting in a frequently disconnected network with intermittent connections. The dynamic behavior of the network can vary according to the location, speed and direction of an aircraft. Additionally, the communication links between vehicles may be short lived, which may deteriorate the performance of applications.

Therefore, routing algorithms in flying ad-hoc networks need to be developed differently from for traditional MANET networks. For such dynamic scenarios, several opportunistic routing protocols have been proposed making usage of replicas of the same message to combat the inherent uncertainty of wireless communication opportunities between nodes. In order to carefully use available resources and reach short delays, many protocols perform forwarding decisions using locally collected knowledge about node behavior to predict which nodes are likely to deliver packets or bring them closer to the destination. Proposed opportunistic routing approaches range from using node mobility to flood the network for fast delivery up to controlling such flooding to achieve the same results based on encounter history, optimized delivery probability, prioritization, or inferring different level of social interactions. However, most of such opportunistic routing protocols rely on the probability of potential forwarders to encounter the destination, which in a flying ad/hoc network encompassing commercial or military aircraft, as well as satellites, may not occur frequently.

Another alternative to route in ad-hoc networks based only on local knowledge, but without relying on the probability of potential forwarders to encounter the destination, is to exploit geographic routing protocols, which make usage of the geographic position of neighbor nodes to make decisions about forwarding packets. A node makes the packet forwarding decision primarily based on the location of the destination and the location of its one-hop neighbors. Such protocols require however to know the geographic position of the destination node. Such requirement can be fulfilled in flying ad-hoc networks, where flying devices do not have a random behavior, as is the case with networks involving commercial or military aircrafts, as well as satellite constellations.

One example of such approaches is the Geographic Perimeter Stateless Routing (GPSR) protocol. Although some geographic routing protocols present interesting properties for flying ad-hoc networks, such as the capability of GPSR of exploiting the beacon messages that are exchanged among nodes and combining parameters like neighbor's speed, direction and link stability, all of the analyzed proposals aim to find the shortest path towards a destination by forwarding packets to neighbors that are closer (with regard to Euclidian distance, curvimetric distance) to the destination. This unicast strategy may not be the most efficient in dynamic networks, where some redundancy (packet replication) should be used to increase the probability of packet delivery, namely to solve issues such as the local optimum problem: e.g., a situation where an intermediate node has no neighbor with progress toward the destination, while a valid route to the destination still exists.

Generally, there are two different approaches for geographic based routing protocols to handle the local optimum problem: the reactive approach, encompassing various kinds of recovery strategies to select an alternative unicast path; the proactive approach, which maintain information about potential holes to avoid the local optimum problem.

Furthermore, geographic routing protocols heavily rely on a location service to provide the accurate location information for a destination. However, it may be difficult to keep all nodes in the network updated about the exact location of all potential destinations. Hence, the routing protocol should be aware of potential effects of mobility-induced location errors.

SUMMARY

It may be seen as an object to increase the performance of routing protocols in dynamic networks, such as networks that include at least some mobile nodes like end devices and/or routing devices that are located in a land vehicle or aircraft. This object is solved by the subject matter disclosed herein.

A method for routing data packets between a first end device and a second end device via a mobile ad-hoc network according to the disclosure herein. Further developments of the disclosure herein are in the following description.

Many of the features described with reference to the method may be implemented as functions of a routing device, or vice versa. Therefore, the description provided in the context of the method applies in an analogous manner also to the routing device.

According to an aspect, a method for routing data packets between a first end device and a second end device via a mobile ad-hoc network that comprises multiple routing devices that are communicatively interconnected with each other is provided. The method comprises the steps: generating, by the first end device, a data request message; sending the data request message to a first routing device; forwarding, by the first routing device the data request message to at least two neighbor routing devices by using a first opportunistic forwarding mechanism, wherein the data request message is forwarded to each of the at least two neighbor routing devices via different routes through the mobile ad-hoc network; providing, by the second end device and in response to the data request message, a requested data packet to a second routing device; forwarding, by the second routing device, the requested data packet via the mobile ad-hoc network to the first end device by using a source based forwarding mechanism; determining, by the second routing device, if the source based forwarding mechanism fails in forwarding the requested data packet to the first end device; and, when the source based forwarding mechanism fails in forwarding the requested data packet to the first end device, using a second opportunistic forwarding mechanism for forwarding the requested data packet to the first end device.

It is an aspect of the method to utilize opportunistic forwarding for a data request message (that may be referred to as interest packet) via two different routes. Source based forwarding is utilized for the requested data packet (that may be referred to as data packet) as a standard and the opportunistic forwarding as a fallback in case the source based forwarding fails.

The first end device may be a data requester, e.g., a client or a data consumer. The second end device may be a data provider, e.g., a server or a data producer.

Typically, the mobile ad-hoc network is composed of multiple routing devices. The architecture of the network typically changes over time, i.e., it is a dynamic environment, and the routing devices may be intermittently connected to each other. For this reason, the data request message (=interest packet) is sent via multiple routes to increase the probability that it reaches its destination. Since the data request message is sent by the first routing device to at least two neighbor routing devices via different routes, this increases the fault tolerance of the data transmission, e.g., this approach deals with changes to the architecture of the mobile ad-hoc network and with routing devices that are not available for a certain period of time or permanently.

According to an embodiment, the method further comprises the steps: determining, by the first routing device, if a requested data packet is available in a content store of the first routing device; when the requested data packet is available in the content store, forwarding the requested data packet to the first end device by using the source based forwarding mechanism; when the requested data packet is not available in the content store, continuing the method with forwarding the data request message to at least two neighbor routing devices.

In this embodiment, the method includes accessing a local content store of the routing devices and using the content store, e.g., like a local cache used to respond to a query without the need to request the data from the actual data producer. This approach reduces the network traffic.

According to a further embodiment, the method further comprises the step of storing, by the first routing device, the requested data packet in the content store of the first routing device.

In this embodiment, the data packet received from the data producer is stored in the content store so that future requests for the same data packet can be answered directly without the need to forward the data request message and the requested data packet through the entire data network.

According to a further embodiment, the forwarding, by using the source based forwarding mechanism, comprises forwarding a requested data packet based on a list of next hops that is stored in a header of the requested data packet.

According to a further embodiment, the first opportunistic forwarding mechanism and/or the second opportunistic forwarding mechanism are configured to forward the data request message and the data packet, respectively, based on a correlation of a destination location, the location of a current network node, and the location of neighbors of the current network node.

According to a further embodiment, the forwarding, by the first routing device, the data request message to at least two neighbor routing devices by using a first opportunistic forwarding mechanism comprises: generating a source tuple identifying the first end device; generating a destination tuple identifying the second end device; defining a path quality tuple identifying a minimum bandwidth and a minimum accumulative transmission latency in a data transmission path; defining a path vector identifying a list of all nodes crossed by the data request message; and adding the source tuple, the destination tuple, the path quality tuple, and the path vector to a header of the data request message.

This embodiment describes how the data request message is generated and which fields it contains in the header. The data request message may optionally include a data identifier.

According to a further embodiment, the method comprises providing a data identifier identifying the requested data packet.

In this embodiment, a data identifier is additionally added. The data identifier can be used to check the existence of data copies in nodes passed by the data request message in its path towards the second end device. When the requested data is present on one of the intermediate nodes, the requested data can be provided by this intermediate node. The data identifier identifies the requested data structure, or it identifies a data server and an application being executed thereon, e.g., by indicating an IP-address and a port.

According to a further embodiment, the source tuple includes at least a geolocation of the source, and optionally a direction value and a speed value. The destination tuple includes at least a geolocation of the destination, and optionally a direction value and a speed value.

According to a further embodiment, the method further comprises,
when the requested data packet is available in the content store: adding the path quality tuple and the path vector tuple contained in the header of the data request message to a local vector associated with the source tuple contained in the data request message to identify the first end device; when the path quality tuple contained in the header of the data request message meets the path quality required for transmitting the requested data packet, formatting the requested data packet to be transmitted to the first end device based on the information stored in the header of the data request message.

In other words, it is first verified if the requested data packet is available in the content store, and if so, the path quality tuple and the path vector tuple are added to the local vector. Then, it is verified if the path quality tuple contained in the header of the data request message meets the path quality required for transmitting the requested data packet to execute the respective method step indicated above.

According to a further embodiment, the method further comprises: when the requested data packet is not available in the content store: determining if the destination tuple contains a geolocation, a direction value, and a speed value, and if so, updating the geolocation in the destination tuple based on the direction value and the speed value, and forwarding the data request message towards a current geolocation of the second end device; when a distance of the first routing device to the second end device is higher than a predetermined hop count value, forwarding, by the first routing device, the data request message to a plurality of routing devices that are closer to the geolocation of the second end device; when the distance of the first routing device to the second end device is smaller than the predetermined hop count value, broadcasting the data request message to all neighbors of the first routing device.

According to a further embodiment, the forwarding, by the second routing device, the requested data packet via the mobile ad-hoc network to the first end device by using a source based forwarding mechanism comprises: generating a source tuple identifying the second end device; generating a destination tuple identifying the first end device; defining a path vector identifying a list of all nodes that define a path of the requested data packet through the mobile ad-hoc network; and adding the source tuple, the destination tuple, and the path vector to a header of the requested data packet.

In this embodiment, the source tuple and the destination tuple are defined from the perspective of the requested data packet that is sent by the second end device to the first end device. However, the source tuple and the destination tuple generally include the same type of information as defined with respect to the data request message that is sent by the first end device to the second end device.

According to a further embodiment the method includes, when the path vector in the header of the requested data packet is not null, forwarding the requested data packet to the next routing device in the path vector; when forwarding to the next routing device in the path vector fails, deleting the path vector in the header of the requested data packet and forwarding the requested data packet following an opportunistic forwarding mechanism.

According to another aspect, a routing device for routing data packets between a first end device and a second end device via a mobile ad-hoc network is provided.

Particularly, the routing device is configured to implement at least some of the method steps described with reference to the method for forwarding data packets.

The routing device is configured to receive, from the first end device, a data request message; forward the data request message to at least two neighbor routing devices via different routes through the mobile ad-hoc network and by using a first opportunistic forwarding mechanism; receive, from the second end device or a neighbor routing device, a requested data packet; forward the requested data packet to the first end device by using a source based forwarding mechanism; determine if the source based forwarding mechanism fails in forwarding the requested data packet to the first end device; and use a second opportunistic forwarding mechanism to forward the requested data packet to the first end device when the source based forwarding mechanism fails to forward the requested data packet to the first end device.

Multiple such routing devices may be interconnected with each other to set up a data network. A routing device may be located aboard an aircraft. The routing device is configured to establish a data connection with one or more end devices located in the same aircraft to provide data services (data producers and data consumers, upload or download data, etc.) to these end devices. A data network set up of multiple routers implements the method steps described above to transmit data packets between two end devices located aboard different aircraft or at different positions.

In one example, an aircraft with a routing device and one or more end devices that are communicatively connected with the routing device is provided. The routing device is connected to other routing devices aboard other aircraft.

BRIEF DESCRIPTION OF THE DRAWINGS

The subject matter will hereinafter be described in conjunction with the following drawing figures, wherein like numerals denote like elements, and wherein.

DETAILED DESCRIPTION

Figure 1:
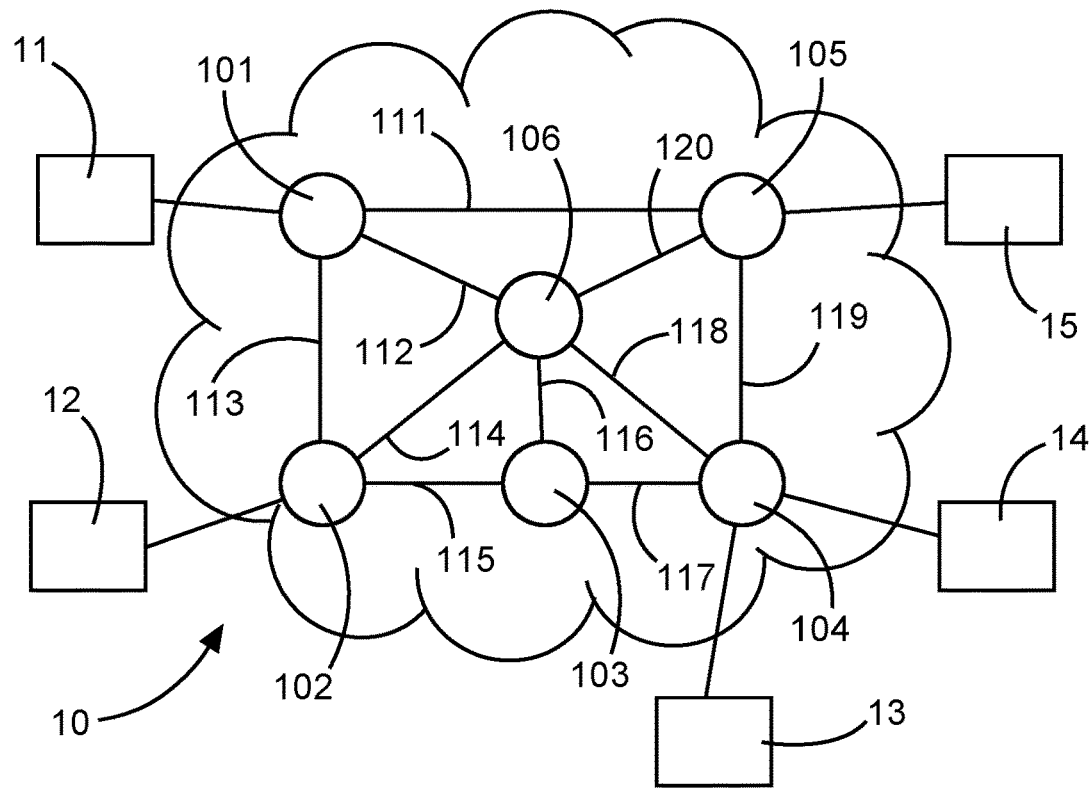
FIG. 1 is a schematic representation of a data network.

The following detailed description is merely as examples in nature and is not intended to limit the disclosure herein and uses of the disclosure herein. Furthermore, there is no intention to be bound by any theory presented in the preceding background or the following detailed description.

The representations and illustrations in the drawings are schematic and not to scale. Like numerals denote like elements.

A greater understanding of the described subject matter may be obtained through a review of the illustrations together with a review of the detailed description that follows.

FIG. 1 shows an example embodiment of a data network 10. The data network 10 may particularly be a network that includes at least some mobile components, like in an airborne mobile ad-hoc network that is set up amongst flying devices (e.g., commercial aircraft, military aircraft, satellites, or the like), some of which have a connection to a ground network infrastructure.

An airborne mobile ad-hoc network typically encompasses intermittent wireless, Radio Frequency (RF) and Free Space Optics (FSO) links among flying devices, as well as between flying devices and the ground: wireless links are intermittently available, since flying devices are only collocated at certain time slots, which may be known in advance or not. It is assumed that in an airborne mobile ad-hoc network, flying devices may dynamically discover each other, through local operations via RF links or based on offline data such as geo-position (provided by systems such as automatic dependent surveillance-broadcast, ADS-B), flight missions and orbits, forming a network with a flat hierarchy.

In such a dynamic setup, where network topology changes over time, geographic routing may be an effective solution for airborne mobile ad-hoc networks especially because of the availability of global positioning system services and grid reference systems (e.g., Military Grid Reference System—MGRS) that allows locating a flying device with different precision (from 10 Km to 1 m, for example).

Since the traffic exchanged over mobile ad-hoc networks can have distinct quality requirements, routing decisions should not be made only based on the shortest path towards a destination, but also based on the conditions of all the links and devices on the potential paths towards the destination. This means that routing in ad-hoc networks should be aware of the performance required by the applications and the local condition of the network.

FIG. 1 shows a data network 10. Multiple end devices 11 to 15 act as data producers and/or data consumers and exchange data via the routing devices 101 to 106. Each of the end devices 11 to 15 is connected via a data link to at least one routing device. The routing devices are intermittently connected with each other via data links 111 to 120. The data links between the end devices and the routing devices may be wireless or wired connections. The data links between the routing devices preferably are wireless connections.

A method for forwarding data request messages (interest packets) and requested data messages (data packets) is described with reference to the data network 10. The data network 10 and the method described herein implement a routing protocol to allow communication in a network made of a large number of mobile units, like aircraft (commercial or military) or several constellation satellites. The method mitigates the limitation of existing protocols enhancing their performance in dynamic flying networks, based on the following properties:

(1) A pull-based message passing is implemented instead of a push-based message passing, aiming to avoid unwanted traffic in the network, and improving the utilization of wireless and computational resources;

(2) Multi-path is used instead of unicast, aiming to increase the system reliability in dynamic scenarios with intermittent connection between routing devices, providing the necessary means to support different types of traffic (by using different paths), and to solve the local optimum problem in a simpler manner;

(3) Source routing is implemented aiming to support fast forwarding of data packets back to requesters via the most suitable path;

(4) Mobility awareness is supported, trying to avoid mobility-induced locations errors.

The proposed multipath geographic routing protocol allows the deployment of different types of flying networks, from a very dynamic one (military aircraft) to less dynamic ones (satellite constellation), passing by predictable ones (multi-hop commercial aircraft) without the need to develop and maintain different routing protocols.

The proposed routing protocol supports both the traditional host based communication model used in the Internet, and the Information-Centric Networking (ICN) paradigm. Being based on a pull-based networking model, the proposed algorithm is aligned with the majority of the current Internet traffic, which is also based on pull services: for instance, all HTTP traffic (the majority of the Internet traffic) rely on data being provided by a server aiming to satisfy a previous request sent by a client. In what concerns ICN, the proposed protocol is well suited to support the natural pull based approach of corporate communication networks (CCN) and named data networking (NDN) based networks. In the case of CCN and NDN networks, the proposed protocol typically works in collaboration with a name resolution system, able to translate names into geographic locators.

Figure 2:
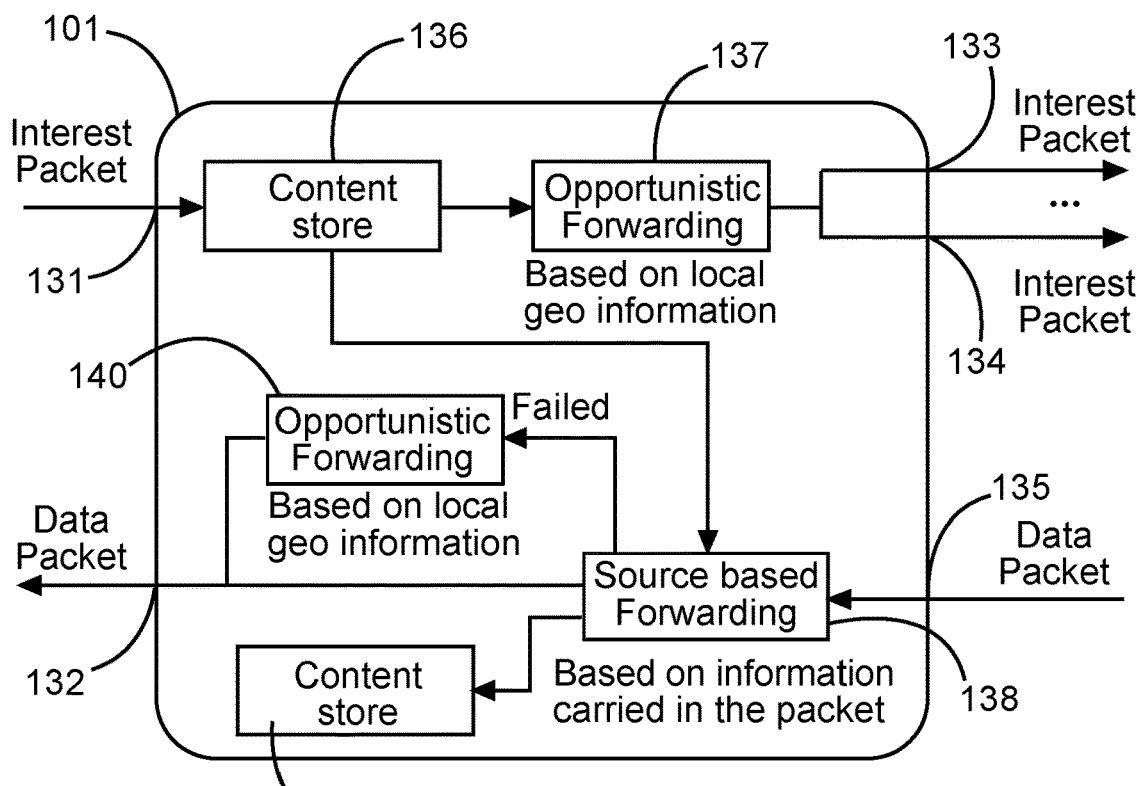
FIG. 2 is a schematic representation of a routing device.

FIG. 2 schematically shows a routing device 101 that implements a routing engine with the functions described herein. While FIG. 2 describes one routing device 101, it is noted that the routing devices of the data network 10 shown in FIG. 1 may be similar or identical and implement the same functions as described with reference to FIG. 2.

The routing device 101 comprises a first interface 131 that receives interest packets. Then, the routing device 101 checks if the requested packet is stored in the content store 136. When the requested packet is not stored in the content store 136, an opportunistic forwarding engine 137 forwards the interest packet via two different interfaces 133, 134 and two different routes towards neighbor routing devices (not shown). This upper part of FIG. 2 indicates the interest packet forwarding.

The lower part of FIG. 2 shows the data packet forwarding. A data packet is received at interface 135 and a routing engine 138 applies source based forwarding to the data packet and the data packet is forwarded via the interface 132 towards the data requester. Additionally, the data packet is stored in the local cache (content store) 139. When the source based forwarding fails, the routing engine applies opportunistic forwarding at block 140.

The routing engine implements a new multi-path geographic strategy, taking advantage of: (1) information about the geolocation of the destination. This information is provided by the application or a name resolution system. This information is formatted, by the routing engine, as a tuple (Geolocation; Direction; Speed). In one situation, the proposed protocol has access to a complete tuple. In a worst case scenario, the tuple is reduced to an entry with information about the geolocation of the destination, meaning the tuple (Geolocation; -; -); (2) information about the geolocation of neighbor nodes. This information is collected periodically from all neighbors visible via an omnidirectional wireless link. Geolocation information is exchanged based on a Hello Message that is broadcasted with hop count equal to one or two. This information is stored by the forwarding engine as a table; (3) information about the data identifier. This information is used to check the existence of data copies in nodes visited in the path towards a data source. In an ICN network, this information is the name of the data structures, as passed by the application. In an IP network, this information can be the tuple (IP-Address, port) of the data server. If this information is not passed to the proposed protocol, it will not check the existence of copies of the requested data in network nodes.

Based on the destination geolocation tuple and the neighbor geolocation table, the routing engine is responsible for forwarding the following two types of packets, as shown in FIG. 2: interest packets and data packets.

Interest packets are sent by a data consumer (a client) in the direction of a data producer (a server). These packets carry in their header a source tuple (Geolocation; Direction; Speed) identifying the source; a destination tuple (Geolocation; Direction; Speed) identifying the destination; a data identifier (optional parameter); a path quality tuple (Bandwidth, Latency) identifying the minimum bandwidth and accumulative latency in the path; a path vector, with a list of all nodes crossed by the interest packet.

Data packets are sent by a data holder via different paths in the direction of a data consumer (a client). Data packets can be generated by the producer of data (a server) or by any device in the network that has a copy of the requested data (a cache). These packets carry in their header: a source tuple (Geolocation; Direction; Speed) identifying the source; a destination tuple (Geolocation; Direction; Speed) identifying the destination; a path vector, with a list of all nodes that should be crossed to reach the destination of the packet (the data consumer/client).

As shown in FIG. 2, the proposed multipath geographic routing protocol follows two different forwarding strategies: opportunistic routing and source routing.

Opportunistic routing forwards packets based on the probability to reach the destination based on the correlation of the destination location, and the location of the current node as well as its neighbors. This strategy is mostly used to forward interest packets, although it can also be used to forward data packets in case the source routing fails.

Source routing forwards packets based on the list of next hops that is stored in the header of the data packet. This strategy can revert to an opportunistic routing strategy in case of transmission failure.

Figure 3:
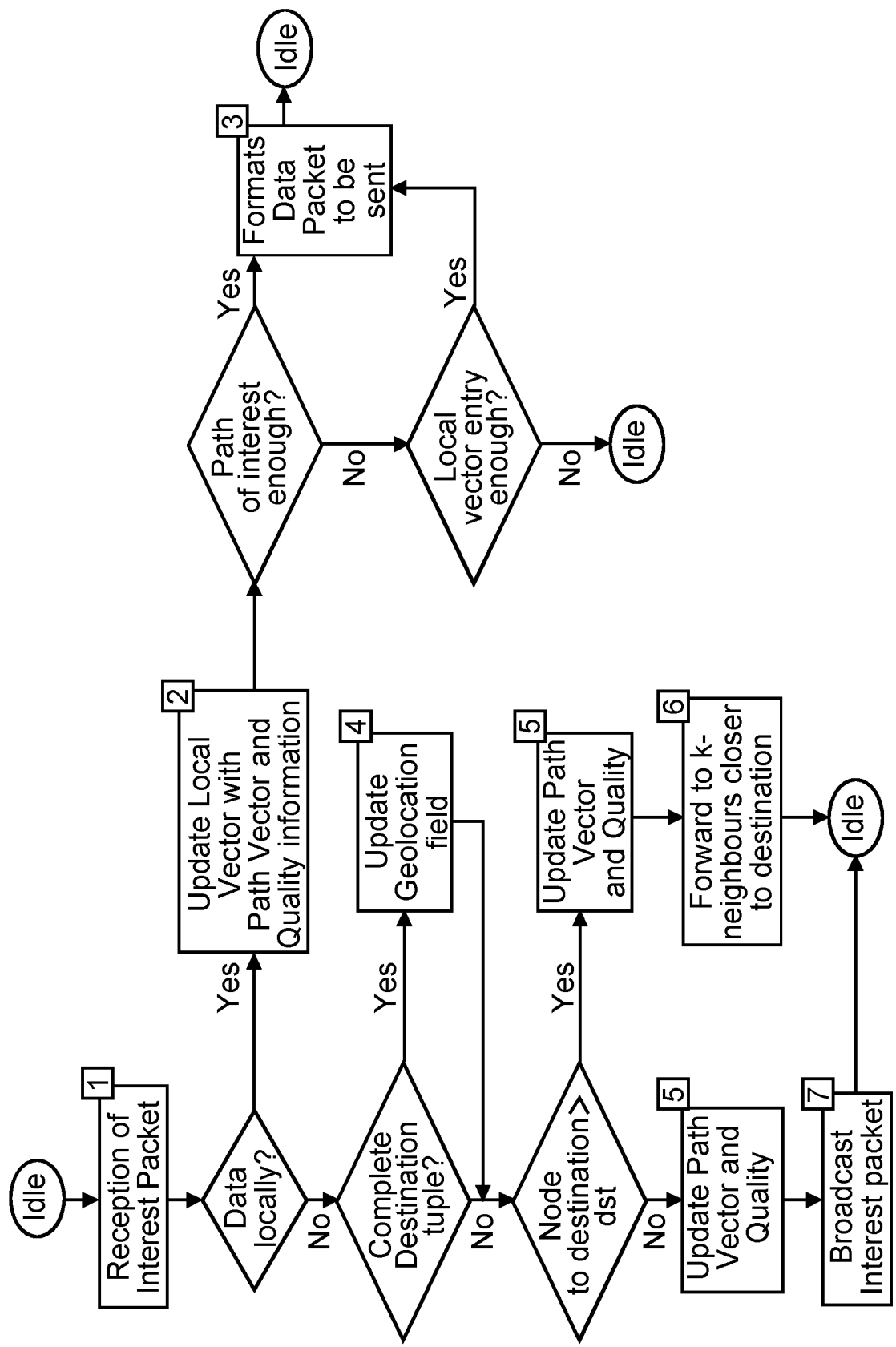
FIG. 3 is a schematic representation of a data request message forwarding strategy.

FIG. 3 schematically shows an implementation of the interest packet forwarding strategy (i.e., the way of forwarding the data requested packet from the data consumer to the data producer) applied by the routing device 101. The interest packet forwarding is implemented based on the information carried in the header of the interest packet (source, destination, data identifier, path quality, path vector).

The method starts at step 1 with receiving an interest packet. Then, the routing device checks if the requested data is available in a local memory or cache (like the content store 136, 139 of FIG. 2). When a copy of the requested data is found in the local memory of the routing device (e.g., when the requested data is supplied by a local application or by a neighbor node), the method proceeds to step 2. In step 2, the path quality and path vector are added to the local vector associated with the source tuple carried in the interest packet (identifying the data consumer). Then, it is verified if the path quality received in the interest packet is enough for the quality required by the locally stored data. If the path quality received in the interest packet is enough for the quality required by the locally stored data, the method proceeds to step 3. In step 3, a data packet is formatted to be sent based on the information received in the interest packet. Otherwise, if the path quality received in the interest packet is not enough for the quality required by the locally stored data, it is verified if there is an entry on the local vector of the source with enough quality to fulfil the requirements of the locally stored data. If such an entry does not exist, the method proceeds to an idle state, otherwise, if such an entry exists, the method proceeds to step 3 in which a data packet is formatted to be sent and the method proceeds to an idle state.

Turning back now to the verification if a copy of the requested data is found in the local memory, if this is not the case, it is verified if the destination tuple is complete.

If the destination tuple is complete, i.e., includes the entries as indicated above, the method proceeds to step 4 in which the routing engine updates the field geolocation in the tuple, based on the fields direction and speed, aiming to forward the interest packet towards the current position of the destination (data holder).

Then, it is verified if the distance from the current node to the destination is higher than a preconfigured threshold value dst.

Independent of the result of this verification and before a copy of the interest packet is forwarded to any neighbor, the path vector and the path quality tuples are updated reflecting the extension of the path and its quality, respectively. The path quality tuple is computed as a function of the values (bandwidth, latency) that are already in the packet (describing the previous path crossed until this point in the network) and the values characterizing the local link, as shown in the two blocks indicated as step 5 in FIG. 3.

If the distance from the current node to the destination is higher than the preconfigured threshold value dst, the method proceeds to steps 5 and 6. In step 6, the routing engine forwards the interest packet to the k-neighbors that are closer to the destination than the current routing engine. In this case k (the number of copies made of the interest packet and sent out) is a local configuration variable. The notion of closer can be implemented by different methods, such as Euclidian distance, or curvimetric distance. The value of dst may be configured based on the type of network, having a small value for more predictable networks such as networks encompassing commercial aircrafts or satellites, to higher values for more dynamic networks, such as military aircraft. After step 6, the method proceeds to an idle state.

If the distance from the current node to the destination is not higher (i.e., smaller or equal) than the preconfigured value dst, the interest packet is broadcasted to all neighbors in step 7 and the method proceeds to an idle state.

Figure 4:
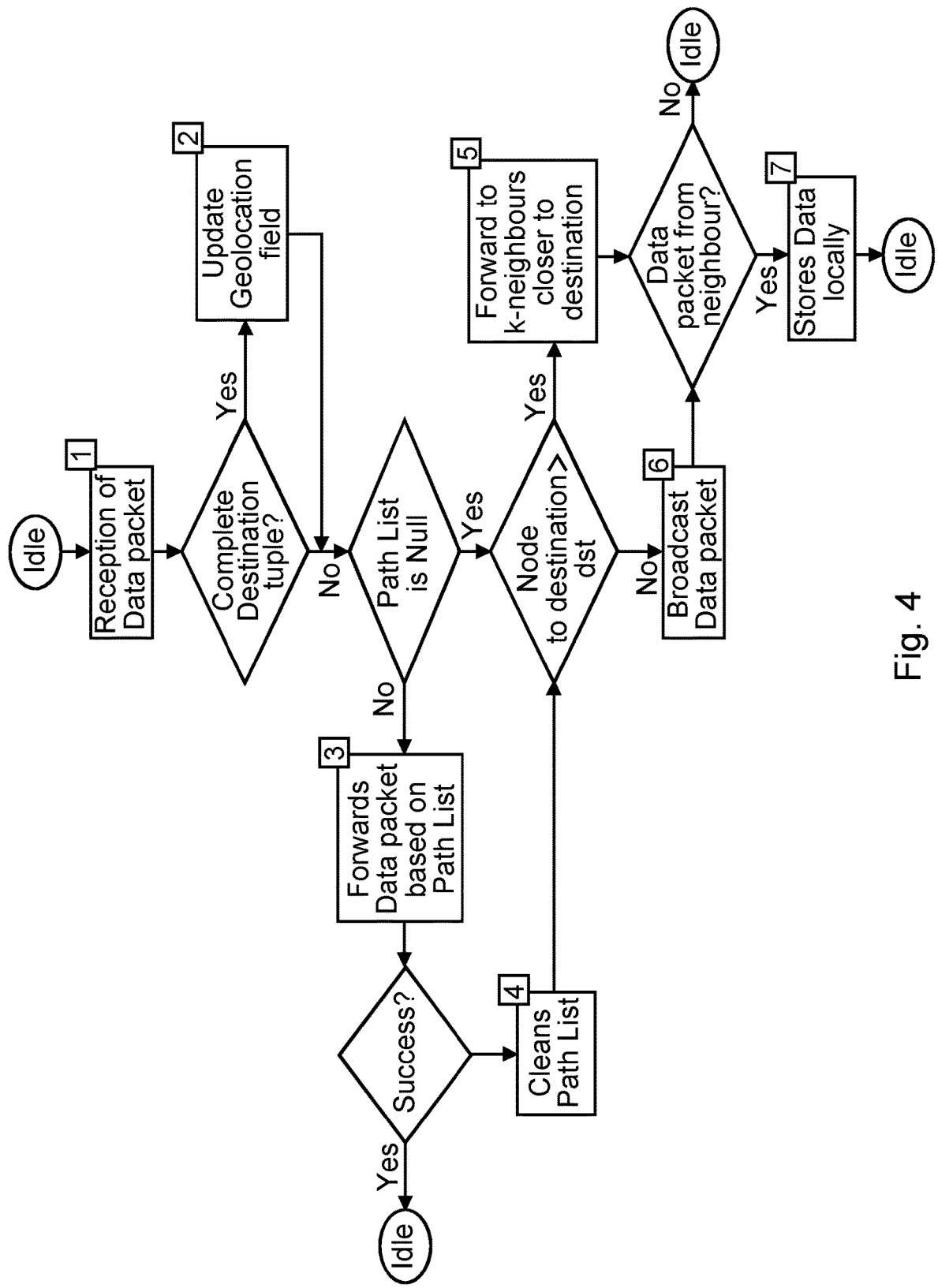
FIG. 4 is a schematic representation of a requested data packet forwarding strategy.

FIG. 4 schematically shows an implementation of a data packet forwarding strategy (i.e., the reverse way of providing or forwarding the requested data from the data producer to the data consumer) applied by the routing device 101 based on the information carried in the data packet header.

In step 1 of the data packet forwarding, a data packet is received from a neighbor or created locally by a local application, or the requested data packet is found in the local cache. In either case, the data packet has the following information in its header: source tuple; destination tuple; path List tuple. When the data packet is created locally, the source tuple of the data packet corresponds to the destination tuple carried in the received interest packet (or a value from the local vector), the destination tuple of the data packet is the source tuple carried in the received interest packet (or a value from the local vector), and the path list is selected from the local vector corresponding to the destination tuple (source tuple in the interest packet).

After having received a data packet (step 1 in FIG. 4), it is verified if the destination tuple is complete (i.e., contains the values referred to above). When the destination couple is complete, the routing engine updates the field geolocation in the tuple (step 2), based on the fields direction and speed, aiming to forward the data packet towards the current position of the destination (data consumer).

Alternatively, if the destination tuple is not complete, it is verified if the path list is null. If the path list is not null, the method proceeds to step 3 and the data packet is forwarded to the neighbor, whose identifier comes next in the path list stored in the data packet header. Then, it is verified if the data packet transmission to the neighbor was successful. If so, the method proceeds to an idle state. Otherwise, the method proceeds to step 4, in which it cleans the path list (so that the path list is null).

The path list may be null before entering step 3 or after completing step 4. Either case proceeds with the same next step: verifying if the distance from the current node to the destination node is higher than a preconfigured value dst.

When the distance from the current node to the destination node is higher than a preconfigured value dst, the method proceeds to step 5 in which the routing engine forwards the data packet to the k-neighbors that are closer to the destination. In this case, k (the number of copies made of the data packet) is a local configuration variable. The notion of closer can be implemented by different methods, such as a Euclidian distance, or a curvimetric distance. The value of dst may be configured based on the type of network, from having a small value for more predictable networks such as a network made of commercial aircraft or satellites, to higher values for more dynamic networks made of military aircraft.

When the distance from the current node to the destination node is not higher (smaller or equal) than the preconfigured value dst, the method proceeds to step 6 in which the data packet is broadcasted to all neighbors.

After forwarding the data packet in either step 5 or step 6, the routing engine stores the data carried in the data packet in its local cache in step 7, following the local implemented cache strategy, if the data packet comes from a neighbor node.

In general, the method described herein relates to a method for forwarding an interest packet (request for data) and a data packet (requested data) by sending a request from the consumer to the correct resolver for the requested data. The requester does not flood the network. In a first instance, the name of the requested data is resolved by a name resolving technology. Then, the data is requested as described above. The method for forwarding an interest packet and a data packet relates to geographic routing and presents a solution for mobile ad-hoc networks, such as airborne ad-hoc networks between multiple aircraft. A position of an aircraft can be typically determined with a high precision. The routing decisions of the routing device are not only based on the shortest path towards a destination, but also on the conditions of all the links and devices on the potential paths towards the destination. The routing is aware of the performance required by the applications and the local conditions of the network. The interest packet and the data packet may be transmitted via two or more paths from the data requester to the data provider and vice versa. First, a local content store is consulted to verify if the requested data is available there. If the data is available in the local content store, the data is provided to the requester. If the data is not available in a local content store, an opportunistic forwarding approach is applied (see FIG. 2, reference sign 137), the geo-position of the current routing device is compared with the geo-position of the target (the geo-position of the target, i.e., of the device that can provide the requested data, is known from a pre-configured look-up table or is requested from an external entity, such as a ground station, mission control, etc., while the target as such is known from the name resolution process), and the interest packet is forwarded to the target via two or more different paths through the network by forwarding the interest packet to one or more neighbor aircraft that are closer to the target. The neighbor routers do the same (verify their local cache, send to one or more neighbor aircraft that are closer to the target). A path vector is created while the interest packet is transmitted from the data requester to the data provider. Each interest packet (i.e., one interest packet per path chosen to transmit a copy of the interest packet towards the target) collects and carries information about the path including information about the routing devices and the communication links between the routing devices. The data packet is sent back the same route in the reverse order. Given that one of the routing devices of a certain path is not available anymore, e.g., due to having changed its position or due to bad connectivity, etc., an opportunistic forwarding strategy is selected for forwarding the data packet to the data requester.

While at least one example embodiment has been presented in the foregoing detailed description, it should be appreciated that a vast number of variations exist. It should also be appreciated that the example embodiment or example embodiments are only examples, and are not intended to limit the scope, applicability, or configuration of the disclosure herein in any way. Rather, the foregoing detailed description will provide those skilled in the art with a convenient road map for implementing an example embodiment of the disclosure herein. It will be understood that various changes may be made in the function and arrangement of elements described in an example embodiment without departing from the scope of the claims.

Additionally, it is noted that "comprising" or "including" does not exclude any other elements or steps and "a" or "an" does not exclude a multitude or plurality. It is further noted that features or steps which are described with reference to one of the above example embodiments may also be used in combination with other features or steps of other example embodiments described above. Reference signs in the claims are not to be construed as a limitation.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

This disclosure is intended to cover any adaptations or variations of the example embodiment(s). Characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

10 data network
11-15 end device
101-106 routing device
111-120 data links
131-135 interfaces

The invention claimed is:

1. A method for routing data packets between a first end device and a second end device via a mobile ad-hoc network that comprises multiple routing devices that are communicatively interconnected with each other, the method comprising:
generating, by the first end device, a data request message;
sending the data request message to a first routing device;
forwarding, by the first routing device the data request message to at least two neighbor routing devices by using a first opportunistic forwarding mechanism, wherein the data request message is forwarded to each of the at least two neighbor routing devices via different routes through the mobile ad-hoc network;
providing, by the second end device and in response to the data request message, a requested data packet to a second routing device;
forwarding, by the second routing device, the requested data packet via the mobile ad-hoc network to the first end device by using a source based forwarding mechanism;
determining, by the second routing device, if the source based forwarding mechanism fails in forwarding the requested data packet to the first end device; and
in response to the source based forwarding mechanism failing to forward the requested data packet to the first end device, using a second opportunistic forwarding mechanism for forwarding the requested data packet to the first end device;

wherein forwarding, by the first routing device, the data request message to at least two neighbor routing devices by using a first opportunistic forwarding mechanism comprising:
generating a source tuple identifying the first end device;
generating a destination tuple identifying the second end device;
defining a path quality tuple identifying a minimum bandwidth and a minimum accumulative transmission latency in a data transmission path;
defining a path vector identifying a list of all nodes crossed by the data request message; and
adding the source tuple, the destination tuple, the path quality tuple, and the path vector to a header of the data request message; and wherein the method further comprises:
in response to the requested data packet being available in the content store, adding the path quality tuple and the path vector tuple contained in the header of the data request message to a local vector associated with the source tuple contained in the data request message to identify the first end device; and
in response to the path quality tuple contained in the header of the data request message meeting the path quality required for transmitting the requested data packet, formatting the requested data packet to be transmitted to the first end device based on the information stored in the header of the data request message.

2. The method of claim 1, further comprising:
determining, by the first routing device, if a requested data packet is available in a content store of the first routing device;
when the requested data packet is available in the content store, forwarding the requested data packet to the first end device by using the source based forwarding mechanism;
when the requested data packet is not available in the content store, continuing the method with forwarding the data request message to at least two neighbor routing devices.

3. The method of claim 2, further comprising storing, by the first routing device, the requested data packet in the content store of the first routing device.

4. The method of claim 1, wherein the forwarding, by using the source based forwarding mechanism, comprises forwarding a requested data packet based on a list of next hops that is stored in a header of the requested data packet.

5. The method of claim 1, wherein the first opportunistic forwarding mechanism and/or the second opportunistic forwarding mechanism is or are configured to forward the data request message and the data packet, respectively, based on a correlation of a destination location, the location of a current network node, and the location of neighbors of the current network node.

6. The method of claim 1, further comprising providing a data identifier identifying the requested data packet.

7. The method of claim 1, wherein the source tuple includes at least a geolocation of the source, and optionally a direction value and a speed value; and
wherein the destination tuple includes at least a geolocation of the destination, and optionally a direction value and a speed value.

8. The method of claim 1, wherein the method comprises:
when the requested data packet is not available in the content store:
determining if the destination tuple contains a geolocation, a direction value, and a speed value, and if so, updating the geolocation in the destination tuple based on the direction value and the speed value, and forwarding the data request message towards a current geolocation of the second end device;
when a distance of the first routing device to the second end device is higher than a predetermined hop count value, forwarding, by the first routing device, the data request message to a plurality of routing devices that are closer to the geolocation of the second end device;
when the distance of the first routing device to the second end device is smaller than the predetermined hop count value, broadcasting the data request message to all neighbors of the first routing device.

9. The method of claim 1, wherein the forwarding, by the second routing device, the requested data packet via the mobile ad-hoc network to the first end device by using a source based forwarding mechanism comprises:
generating a source tuple identifying the second end device;
generating a destination tuple identifying the first end device;
defining a path vector identifying a list of all nodes that define a path of the requested data packet through the mobile ad-hoc network; and
adding the source tuple, the destination tuple, and the path vector to a header of the requested data packet.

10. The method of claim 9,
wherein, when the path vector in the header of the requested data packet is not null, forwarding the requested data packet to the next routing device in the path vector;
when forwarding to the next routing device in the path vector fails, deleting the path vector in the header of the requested data packet and forwarding the requested data packet following an opportunistic forwarding mechanism.

11. A routing device for routing data packets between a first end device and a second end device via a mobile ad-hoc network,
wherein the routing device is configured to:
receive, from the first end device, a data request message;
forward the data request message to at least two neighbor routing devices via different routes through the mobile ad-hoc network and by using a first opportunistic forwarding mechanism;
receive, from the second end device or a neighbor routing device, a requested data packet;
forward the requested data packet to the first end device by using a source based forwarding mechanism;
determine if the source based forwarding mechanism fails in forwarding the requested data packet to the first end device;
use a second opportunistic forwarding mechanism to forward the requested data packet to the first end device in response to the source based forwarding mechanism failing to forward the requested data packet to the first end device;
wherein forwarding the data request message to at least two neighbor routing devices includes the routing device being configured to use a first opportunistic forwarding mechanism, including the routing device being configured to:

generate a source tuple identifying the first end device;
generate a destination tuple identifying the second end device;
define a path quality tuple identifying a minimum bandwidth and a minimum accumulative transmission latency in a data transmission path;
define a path vector identifying a list of all nodes crossed by the data request message; and
add the source tuple, the destination tuple, the path quality tuple, and the path vector to a header of the data request message; and
wherein the routing device is further configured to:
in response to the requested data packet being available in the content store, add the path quality tuple and the path vector tuple contained in the header of the data request message to a local vector associated with the source tuple contained in the data request message to identify the first end device; and
in response to the path quality tuple contained in the header of the data request message meeting the path quality required for transmitting the requested data packet, format the requested data packet to be transmitted to the first end device based on the information stored in the header of the data request message.

* * * * *